US012802391B2

(12) United States Patent
Kim et al.

(10) Patent No.: US 12,802,391 B2
(45) Date of Patent: Nov. 17, 2026

(54) APPARATUS AND METHOD FOR RECOGNIZING IMAGE AND PROMPT TUNING METHOD RELATED TO THE SAME

(71) Applicant: ELECTRONICS AND TELECOMMUNICATIONS RESEARCH INSTITUTE, Daejeon (KR)

(72) Inventors: Hyungil Kim, Daejeon (KR); Kimin Yun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 266 days.

(21) Appl. No.: 18/754,332

(22) Filed: Jun. 26, 2024

(65) Prior Publication Data

US 2025/0104383 A1 Mar. 27, 2025

(30) Foreign Application Priority Data

Sep. 25, 2023 (KR) ........................ 10-2023-0128173
Mar. 6, 2024 (KR) ........................ 10-2024-0031959

(51) Int. Cl.
*G06V 10/26* (2022.01)
*G06V 10/77* (2022.01)
(Continued)

(52) U.S. Cl.
CPC .......... *G06V 10/26* (2022.01); *G06V 10/7715* (2022.01); *G06V 10/778* (2022.01); *G06V 10/82* (2022.01)

(58) Field of Classification Search
CPC .. G06V 10/26–273; G06V 10/25; G06T 7/12; G06T 7/11; G06T 7/194
See application file for complete search history.

(56) References Cited

U.S. PATENT DOCUMENTS 11,593,587 B2 2/2023 Lee et al.
11,709,880 B2 7/2023 Lee et al.

FOREIGN PATENT DOCUMENTS

JP 2021-152692 A 9/2021
KR 10-2020-0124280 A 11/2020
(Continued)

OTHER PUBLICATIONS

Kirillov, Segment Anything, arXiv:2304.02643v1 [cs.CV] Apr. 5, 2023, https://arxiv.org/pdf/2304.02643 (Year: 2023).*
(Continued)

*Primary Examiner* — Raphael Schwartz
(74) *Attorney, Agent, or Firm* — LRK PATENT LAW FIRM

(57) ABSTRACT

Provided is an apparatus for image recognition, the apparatus including: a first encoding module configured to extract image feature information from an input image; a second encoding module configured to encode a user input related to segmentation of the input image to extract prompt feature information; a tuning module configured to tune the extracted prompt feature information according to a specified purpose using the image feature information and the extracted prompt feature information; and a decoding module configured to generate a segmentation mask based on the image feature information and the tuned prompt feature information.

17 Claims, 20 Drawing Sheets

(51) Int. Cl.
*G06V 10/778* (2022.01)
*G06V 10/82* (2022.01)

(56) References Cited

FOREIGN PATENT DOCUMENTS

| | | | |
|---|---|---|---|
| KR | 10-2023-0003841 | A | 1/2023 |
| KR | 10-2553519 | B1 | 7/2023 |
| KR | 10-2563550 | B1 | 8/2023 |
| KR | 10-2566614 | B1 | 8/2023 |
| WO | 2022/243985 | A1 | 11/2022 |

OTHER PUBLICATIONS

Zhang, Personalize Segment Anything Model with One Shot, May 4, 2023, https://arxiv.org/pdf/2305.03048v1 (Year: 2023).*

Renrui Zhang et al., "Personalize Segment Anything Model with One Shot", arXiv:2305.03048v2 [cs.CV] Oct. 4, 2023.

Alexander Kirillov et al., "Segment Anything", arXiv:2304.02643v1 [cs.CV] Apr. 5, 2023.

* cited by examiner

1320

1310

Original SAM results

Proposed prompt tuning based SAM results

APPARATUS AND METHOD FOR RECOGNIZING IMAGE AND PROMPT TUNING METHOD RELATED TO THE SAME

CROSS-REFERENCE TO RELATED APPLICATIONS

This application claims priority to and the benefit of Korean Patent Application No. 10-2024-0031959, filed on Mar. 6, 2024, and Application No. 10-2023-0128173, filed on Sep. 25, 2023, the disclosure of which is incorporated herein by reference in its entirety.

BACKGROUND

1. Field of the Invention

Various embodiments disclosed in this document relate to artificial intelligence (AI)-based image segmentation technology.

2. Description of Related Art

Through the development of deep learning-based machine learning and artificial intelligence (AI), research and applications for accurately recognizing the positions and types of objects in an image have been developed. Recently, large-scale AI models referred to as foundation models have developed, and image recognition technology has significantly expanded in terms of versatility. For example, the Segment Anything Model (SAM) surpasses the past class-based object segmentation to literally segment anything recognized as an object regardless of class information.

FIGS. 1 and 2 are examples of an input and an output (left: input, right: output) of the SAM.

Since the SAM is trained with a very large amount of data, it can segment areas of an image without additional training with a user. For example, as shown in FIG. 1, when position coordinates (a point prompt) of an object to be segmented are set by a prompt input, the SAM may output an area that is most similar to the object at the position.

In addition, the SAM may provide excellent performance in object segmentation of complex images, such as oil paintings, marine images, and medical images, shown in FIG. 2, in addition to captured photos. This is because the SAM has been trained with a large amount of training data-including more than thousands to millions of images and more than one billion pieces of correct answer data of object areas (masks) corresponding to the images.

SUMMARY OF THE INVENTION

However, the SAM may provide segmentation results that are different from a user's intention depending on a user's input. FIG. 3 illustrates output results according to a position selected by a user of the SAM. Referring to FIG. 3, the SAM may, when segmenting a license plate from a front image of a vehicle, provide very different segmentation results depending on a minute change in the position of the user input. Such a limitation occurs because the SAM does not clearly estimate the user's intention to segment the license plate of the vehicle. In detail, since the SAM has been developed for general use, the SAM may not accurately identify a user's intention to segment specific parts (e.g., parts of "ㄱ," license plate, and "ㅏ" in an image "가") of the license plate image. Therefore, the user of the SAM needs to endure the inconvenience of adjusting inputs multiple times to obtain a desired segmentation result.

Various embodiments disclosed in this document provide an apparatus and method for image recognition capable of segmenting or masking a part of an input image according to a prompt input intended by a user, and a prompt tuning method related to the same.

According to an aspect of this disclosure, an apparatus for image recognition 500 is provided. The apparatus includes: a first encoding module 610 configured to extract image feature information from an input image; a second encoding module 620 configured to encode a user input related to segmentation of the input image to extract prompt feature information; a tuning module 630 configured to tune (or modulate) the extracted prompt feature information according to a specified purpose using the image feature information and the extracted prompt feature information; and a decoding module 640 configured to generate a segmentation mask based on the image feature information and the tuned prompt feature information.

According to another aspect of this disclosure, present disclosure a prompt tuning method related to image segmentation is provided. The method includes: obtaining, from an input image, a feature map which is generated by a decoding module; wherein the decoding module is configured to generate a segmentation mask corresponding to prompt feature information input; learning representative points of the segmentation mask according to a specified purpose based on the feature map; tuning the prompt feature information according to a specified purpose based on a learning error of the representative points; and providing the tuned prompt feature information as an input to the decoding module in relation to the input image.

According to another aspect of this disclosure, an image segmentation method includes: extracting image feature information from an input image; encoding a user input related to segmentation of the input image to extract prompt feature information; tuning the extracted prompt feature information according to a specified purpose using the image feature information and the extracted prompt feature information; and generating a segmentation mask based on the image feature information and the tuned prompt feature information.

BRIEF DESCRIPTION OF THE DRAWINGS

In relation to the description of the drawings, identical or similar reference numerals may be used for identical or similar components.

DETAILED DESCRIPTION OF EXEMPLARY EMBODIMENTS

Figure 1:
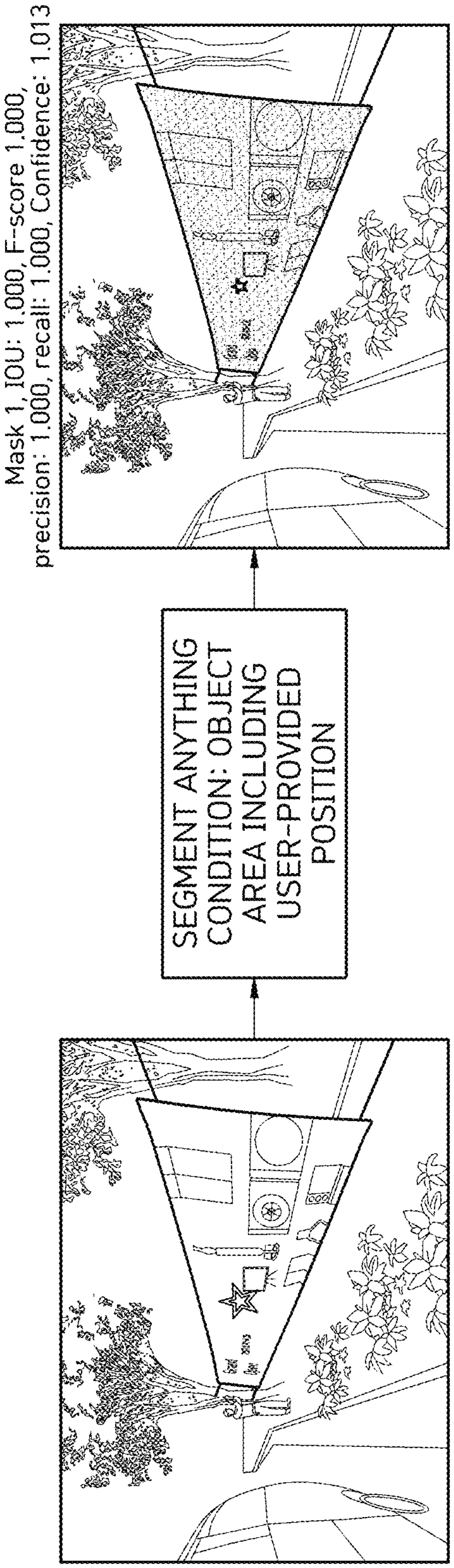
FIGS. 1 and 2 are exemplary diagrams illustrating an input and an output (left: input, right: output) of the Segment Anything Model (SAM).
Figure 2:
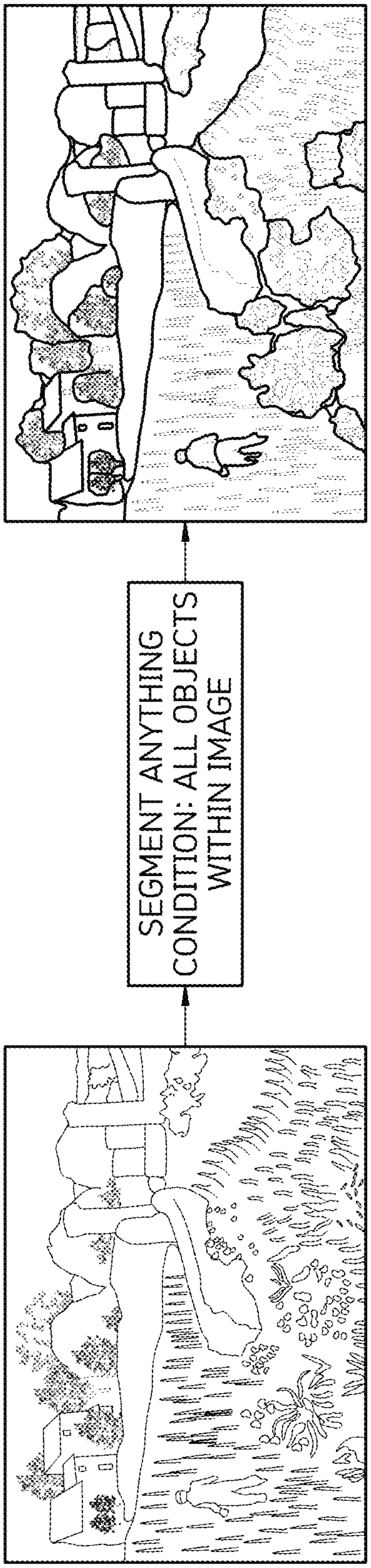
Figure 3:
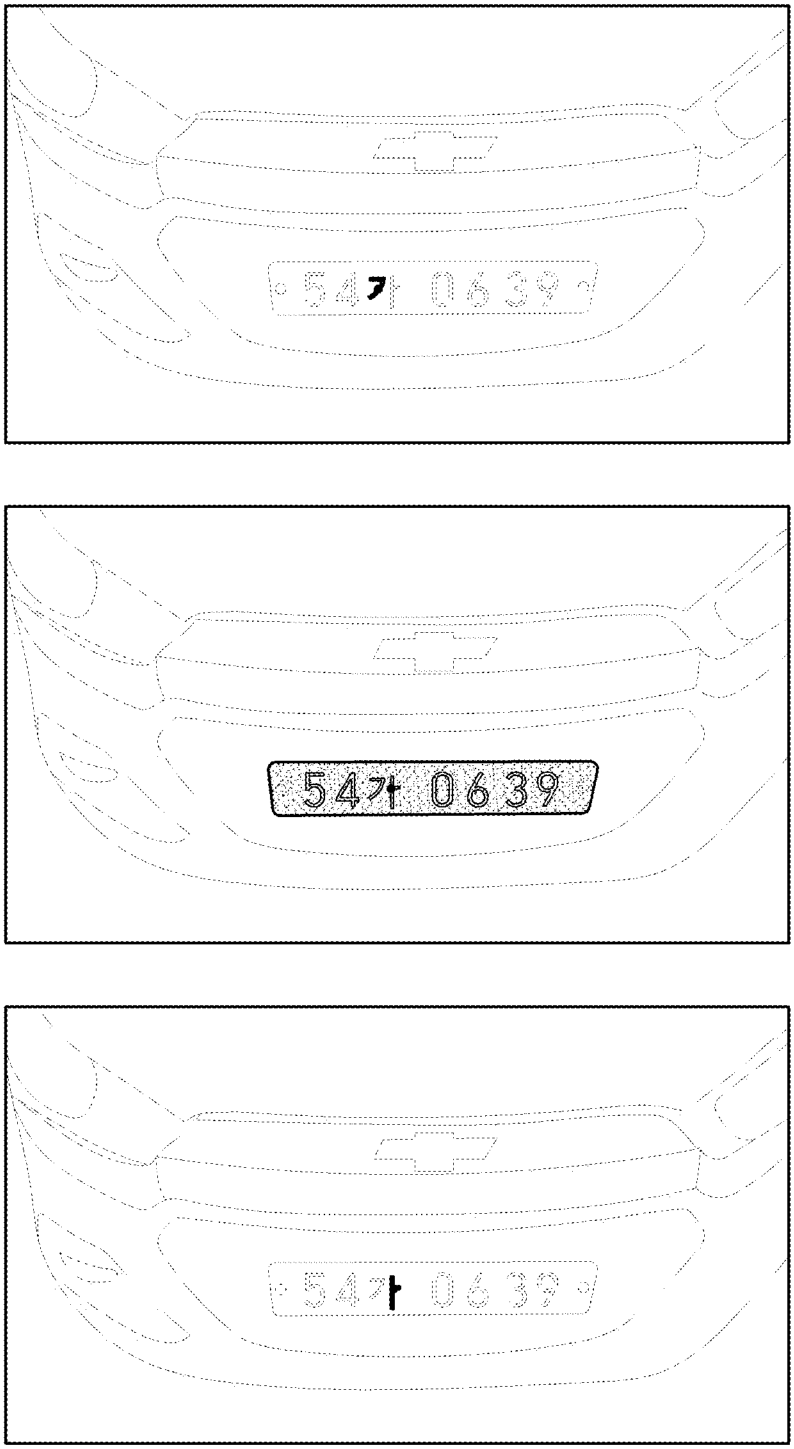
FIG. 3 is an exemplary diagram of output results according to a selection position input by a user of the SAM.
Figure 4:
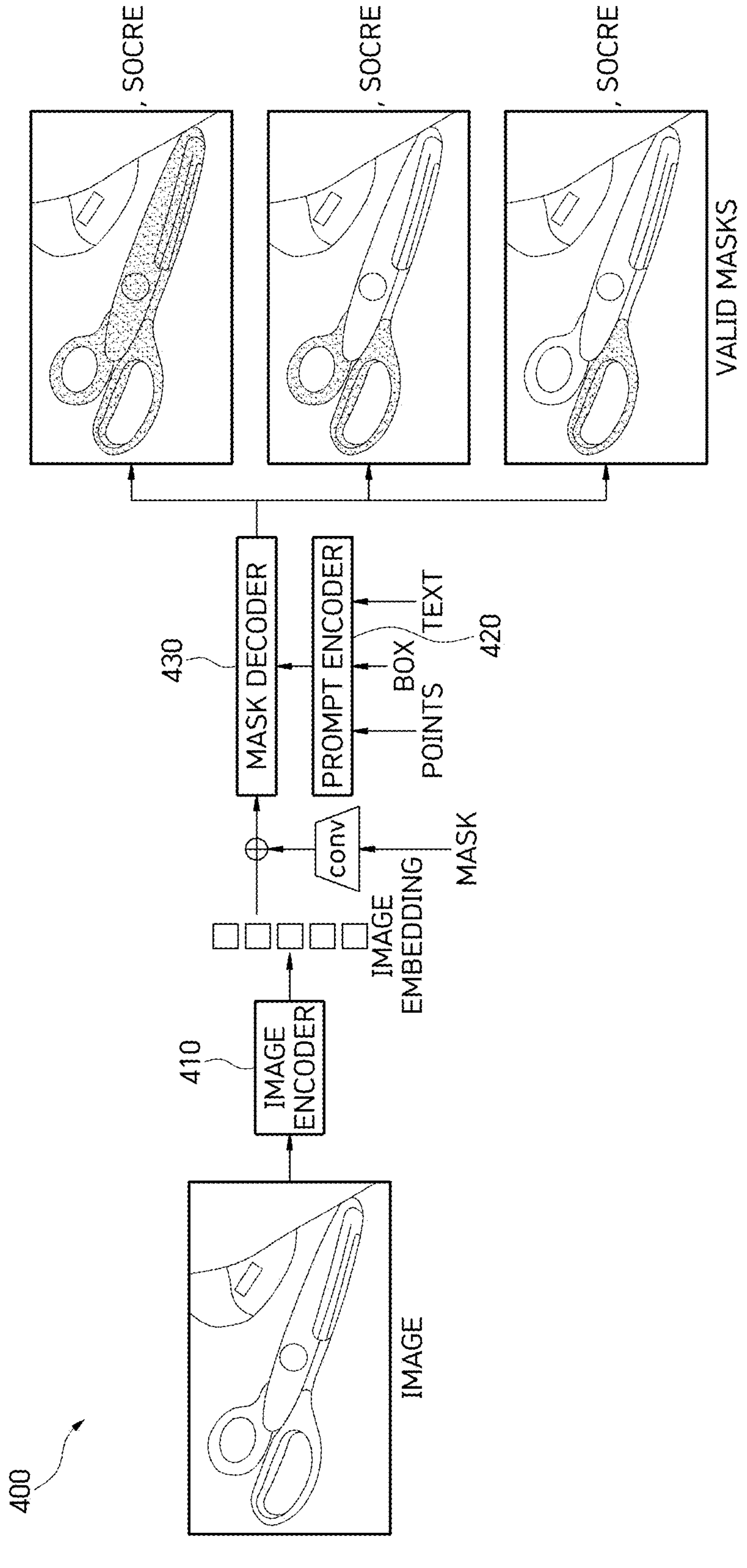
FIG. 4 is a block diagram illustrating a configuration of the SAM.

FIG. 4 is a block diagram illustrating a configuration of a Segment Anything Model.

Referring to FIG. 4, an apparatus for image recognition 400 (e.g., Segment Anything) according to an embodiment may include an image encoder 410, a prompt encoder 420, and a mask decoder 430.

According to an embodiment, the apparatus for image recognition 400 may perform image segmentation through, for example, an image segmentation model (e.g., a Segment Anything model (SAM)). The SAM is a model developed to resolve segmentation issues in the field of computer vision, and may be modeled by learning large-scale datasets, particularly 11 million images including 100 million segmentation masks. The image segmentation model has promptable characteristics that may provide a variety of outputs that vary depending on the input prompt. The image segmentation models may provide a strong generalization ability based on the promptable characteristics.

The image encoder 410 is a module which extracts features of an input image and may be constructed with a vision transformer (ViT) structure.

The prompt encoder 420 may process a prompt input by a user to encode input or intended information.

The mask decoder 430 may obtain outputs of the image encoder 410 and the prompt encoder 420 as inputs thereof, and generate a segmentation mask based on the respective obtained inputs.

Figure 5:
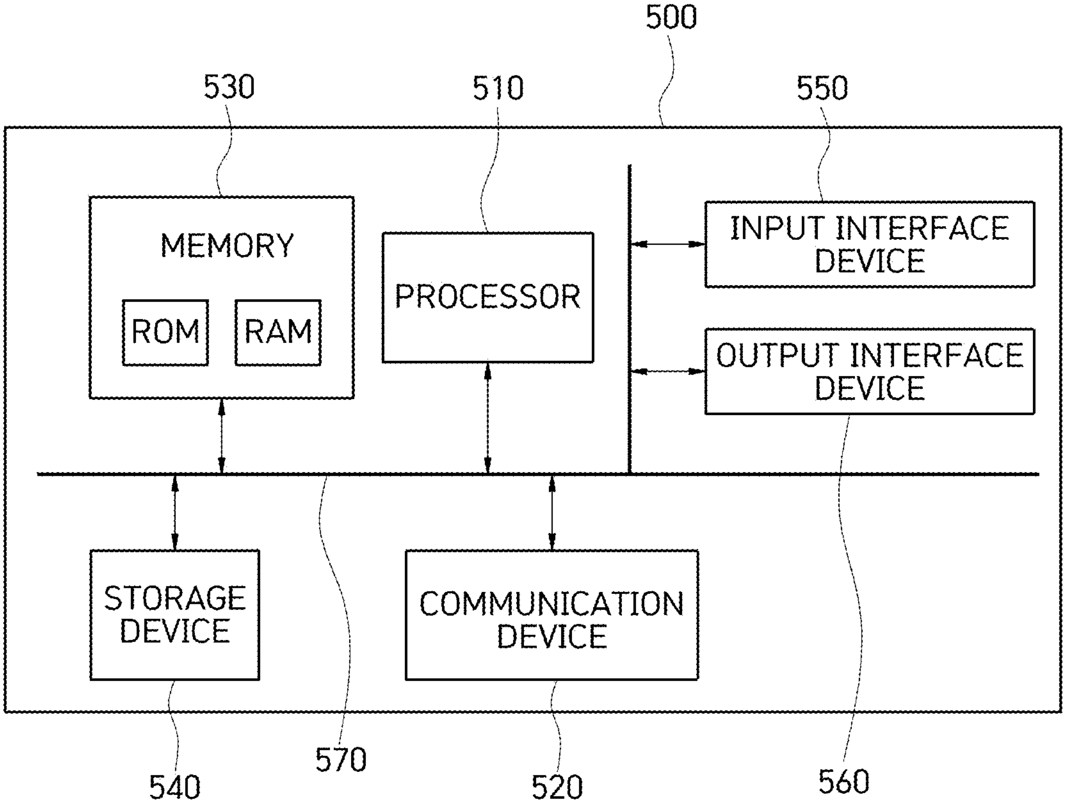
FIG. 5 is a block diagram illustrating a hardware configuration of an apparatus for image recognition according to an embodiment of the present disclosure.

FIG. 5 is a block diagram illustrating a hardware configuration of an apparatus for image recognition according to an embodiment of the present disclosure.

Referring to FIG. 5, an apparatus for image recognition 500 according to an embodiment may include at least one of a processor 510, a memory 530, an input interface device 550, an output interface device 560, and a storage device 540. The apparatus for image recognition 500 may further include a communication device 520 coupled to a network.

The input interface device 550 may receive an input of a user who uses the apparatus for image recognition 500. The user input may include, for example, a prompt related to at least one of a point, a bounding box, text, a mask, and user speech related to the input image.

The output interface device 560 may output data related to at least one of a symbol, a number, and a character visually or audibly under the control of the processor 510. The output interface device 560 may include an output device related to at least one of a liquid crystal display, an organic light emitting diode (OLED) display, a touch screen display, and a speaker.

The communication device 520 may support establishment of a communication channel or wireless communication channel between the apparatus for image recognition 500 and another apparatus (e.g., a user terminal (not shown)), and performance of communication through the established communication channel. The communication channels may include, for example, at least one communication channel among a local area network (LAN), fiber to the home (FTTH), a digital subscriber line (xDSL), wireless broadband (WiBro), a wireless LAN, Wi-Fi, Bluetooth, Zigbee, Wi-Fi Direct (WFD), ultra-wideband (UWB) infrared communication (IrDA; Infrared Data Association), Bluetooth Low Energy (BLE), near field communication (NFC), 3G, 4G, or 5G. The communication device 520 may communicate using known communication methods, such as code division multiple access (CDMA), Global System for Mobile Communications (GSM), W-CDMA, time division-synchronous code division multiple access (TD-SCDMA), WiBro, Long Term Evolution (LTE), and Evolved Packet Core (EPC).

The memory 530 and the storage device 540 may include various types of volatile or non-volatile storage media. For example, the memory 530 may include a read only memory (ROM) and a random access memory (RAM). In an embodiment, the memory 530 may be located inside or outside the processor 510, and the memory 530 may be connected to the processor 510 through various known means. The memory 530 may store various types of data used by at least one component (e.g., the processor 510) of the apparatus for image recognition 500. The data may include, for example, input data or output data for software and instructions related thereto. For example, the memory 530 may store at least one instruction for providing an image segmentation service based on an input prompt. The at least one instruction may include, for example, instructions for the operation of the processor 510 and each of a first encoding module 610, a second encoding module 620, a tuning module 630, and a decoding module 640, which are shown in FIG. 6.

The processor 510 may be a semiconductor device that executes instructions stored in the memory 530 or the storage device 540. The processor 510 may control at least one other component (e.g., a hardware or software component) of the apparatus for image recognition 500 and may perform various data processing processes or operations. The processor 510 may include, for example, at least one of a central processing unit (CPU), a graphics processing unit (GPU), a microprocessor, an application processor, an application specific integrated circuit (ASIC), and a field programmable gate array (FPGA), and may have a plurality of cores.

Figure 6:
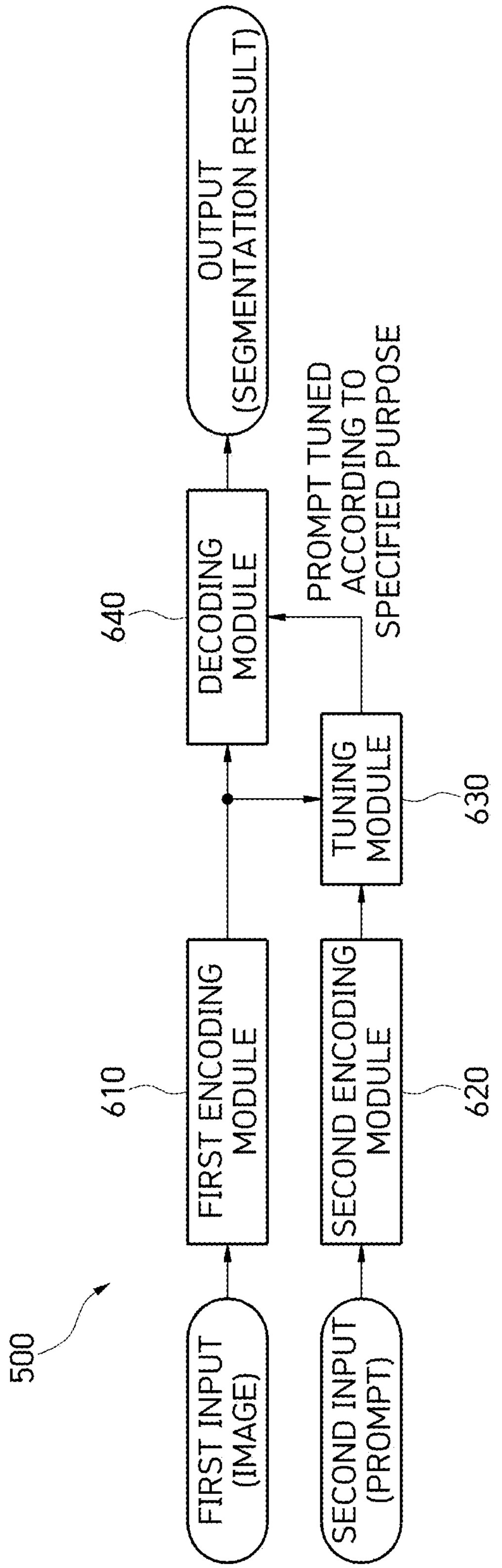
FIG. 6 is a block diagram illustrating a detailed configuration of an apparatus for image recognition according to an embodiment.

FIG. 6 is a block diagram illustrating a detailed configuration of an apparatus for image recognition according to an embodiment.

Referring to FIG. 6, the apparatus for image recognition 500 according to the embodiment may include a first encoding module 610, a second encoding module 620, a tuning module 630, and a decoding module 640. In an embodiment, the apparatus for image recognition 500 may not include some components or may further include additional components. Additionally, some of the components of the apparatus for image recognition 500 may be combined into a single component, but perform the same functions of the components before the combination. In an embodiment, the first encoding module 610, the second encoding module 620, the tuning module 630, and the decoding module 640 may be hardware/software modules included in the processor 510 or software modules executed by the processor 510 based on instructions stored in the memory 530.

According to an embodiment, the first encoding module 610 may extract image feature information from an input image. For example, the first encoding module 610 may be constructed with a ViT structure based on a masked auto encoder. The first encoding module 610 may be constructed as a ViT-H/16 model. The first encoding module 610 may be configured to encode an image with a specified resolution (e.g., 1024×1024 resolution). For example, the first encoding module 610 may adjust an image having a resolution other than a specified resolution to the specified resolution through padding and rescaling. And then the first encoding module 610 may extract image feature information (hereinafter referred to as a "feature map") based on the image of the specified resolution.

According to an embodiment, the second encoding module 620 may obtain a user input related to segmentation of the input image. The second encoding module 620 may encode the obtained user input to generate prompt feature information. For example, the user input may include input information related to at least one of a point, a bounding box, text, a mask, and user speech related to the input image. The second encoding module 620 may perform an AND operation on inputs related to a plurality of information and extract user-intended prompt feature information based on the operation result.

According to one embodiment, the second encoding module 620 may, for a point prompt, obtain a two-dimensional coordinate value and a label (0 or 1) which distinguishes a background/foreground. For a bounding box prompt, the second encoding module 620 may obtain coordinates of an upper left end and a lower right end (a, b, c, and d) of a bounding box and a label which distinguishes a background/foreground as an input. For a mask prompt, the second encoding module 620 may extract features of input masks through a convolution structure and use the extracted mask features as an input.

According to an embodiment, the decoding module 640 may generate a segmentation mask from the input image based on image feature information and tuned prompt feature information. For example, the decoding module 640 may search for a masking area (or a segmentation area) according to a user's intention from an input image based on image feature information and tuned prompt feature information, and mask or segment the searched area according to the user's intention.

According to an embodiment, the tuning module 630 may tune the prompt feature information according to a specified purpose using the image feature information and the prompt feature information to generate tuned prompt feature information. The specified purpose may include, for example, at least one of masking or segmenting a specific area.

According to one embodiment, the tuning module 630 may apply a self-attention operation, a cross-attention operation, and a multi-layer perceptron to at least one of the extracted prompt feature information and the extracted image feature information to obtain a prompt change amount. And the tuning module 630 may generate the tuned prompt feature information based on the prompt change amount and the extracted prompt feature information.

In an embodiment, the tuning module 630 may provide the tuned prompt feature information as an input to the decoding module 640 in relation to the input image. Accordingly, the decoding module 640 may accurately search for an area according to a user's intention based on the tuned prompt feature information and segment or mask the searched area according to the user's intention.

According to an embodiment, the tuning module 630 may be configured (or modeled) to learn an input prompt based on a loss function, to tune the prompt feature information. Learning of the tuning module 630 will be described below with reference to FIGS. 9 and 10.

As described above, the apparatus for image recognition 500 according to an embodiment may be implemented to, while having the same or similar inference operation as an image segmentation model, such as Segment Anything, train the image segmentation model to suit a user's purpose and a domain using a prompt tuning network that may additionally learn an input prompt based on a data set suitable for the domain of a segmentation target.

Additionally, the apparatus for image recognition 500 according to an embodiment may learn the prompt tuning while adjusting the degree or area of image segmentation at a prompt feature level, thereby providing image segmentation results accurately reflected a user's intention. Therefore, the apparatus for image recognition 500 according to an embodiment may resolve the limitations of the related art of segmentation technique that requires additional adjustment and intervention by a user to obtain a desired result because a user's specific intention is not recognized with only point information.

In addition, the apparatus for image recognition 500 according to an embodiment does not significantly change the structure or learning processing of a large-scale deep learning model, thereby reducing the time and effort for an image segmentation learning process.

Figure 7:
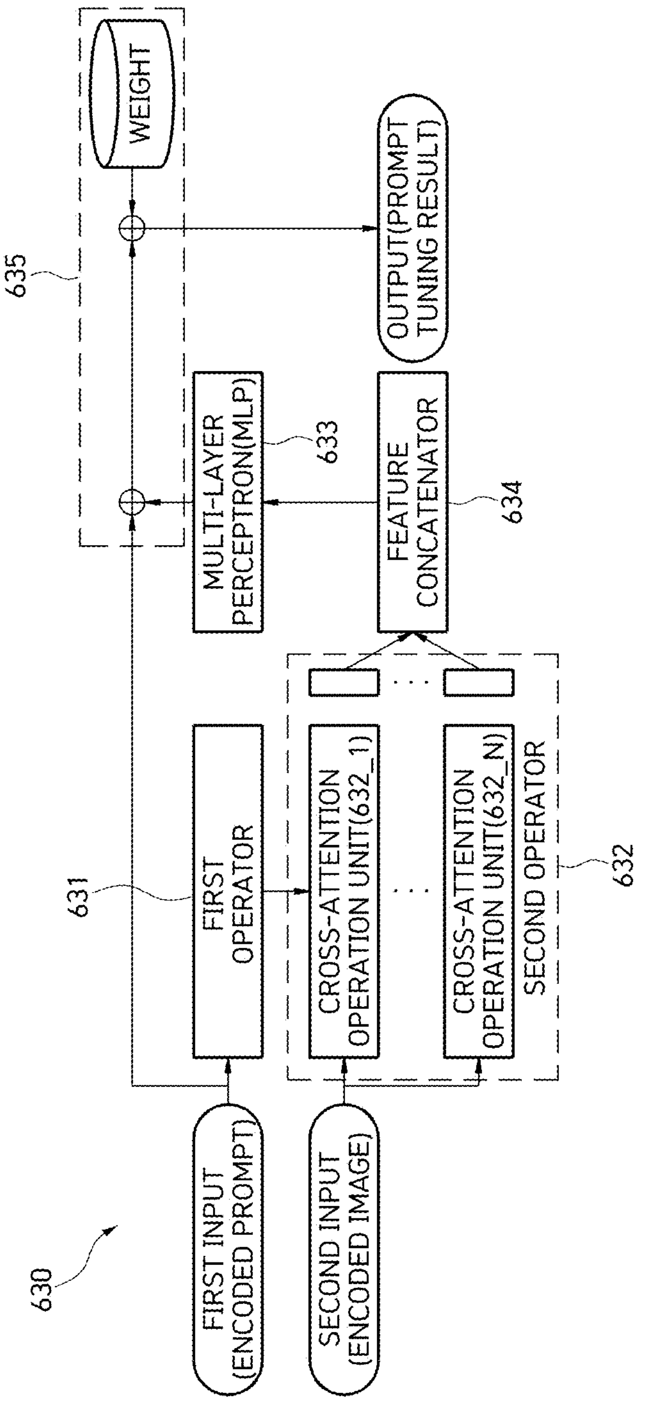
FIG. 7 is a block diagram illustrating a detailed configuration of a tuning module according to an embodiment.
Figure 8:
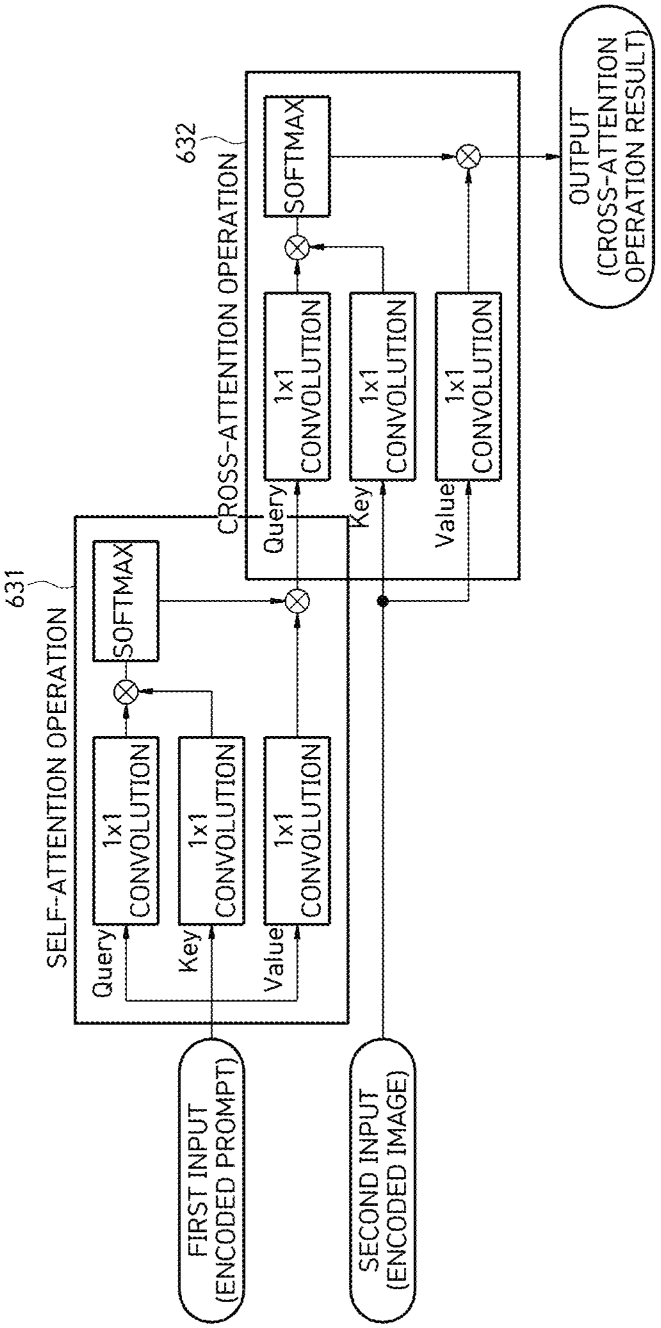
FIG. 8 is a block diagram illustrating a detailed configuration of a portion of a tuning module according to an embodiment.

FIG. 7 is a block diagram illustrating a detailed configuration of a tuning module according to an embodiment, and FIG. 8 is a block diagram illustrating a detailed configuration of a portion of a tuning module according to an embodiment.

Referring to FIG. 7, the tuning module 630 according to an embodiment may include a first operator 631, a second operator 632, a feature concatenator 634, a multi-layer perceptron 633, and a summator 635.

According to an embodiment, the first operator 631 may perform a self-attention operation on the prompt feature information from the second encoding module 620.

Referring to FIG. 8, the first operator 631 may extract a key, a query, and a value from the prompt feature information and perform a self-attention operation.

According to an embodiment, the second operator 632 may perform a cross-attention operation on the output of the first operator 631 (the result of the self-attention operation based on the prompt feature information) and the image feature information. Referring to FIG. 8, the second operator 632 may obtain the result of the first operator 631 as a query, and obtain a key and value from the image feature information to perform a cross-attention operation.

In an embodiment, the second operator 632 may include a plurality of sub-operation units 632_1 to 632_N (N is a constant), and may perform a cross-attention operation in parallel using different parameters (multiple heads) by the plurality of sub-operation units 632_1 to 632_N. For example, in order to determine the degree to which the encoded prompt feature information is to be modified based on the input image feature information, the second operator 632 may extract feature values through the cross-attention operation.

The feature concatenator 634 may concatenate the results of the cross-attention operation processed in parallel with different parameters by the plurality of sub-computation units 632_1 to 632_N to synthesize (or combine) the results. The multi-layer perceptron 633 may learn the output (a total feature value) of the feature concatenator 634 to extract a prompt change amount.

The summator 635 may weighted sum on the extracted prompt feature information and the prompt change amount to generate a final tuning result (hereinafter referred to as "tuned prompt feature information") for the extracted prompt feature information.

According to the above-described embodiment, the first operator 631, the second operator 632, the feature concatenator 634, the multi-layer perceptron 633, and the summator 635 may be constructed (or be modeled) through supervised learning on image segmentation from training datasets (images) of a specified domain. The training dataset of the specified domain may include images which are similar in terms of image types, or in terms of image areas to be segmented.

Figure 9:
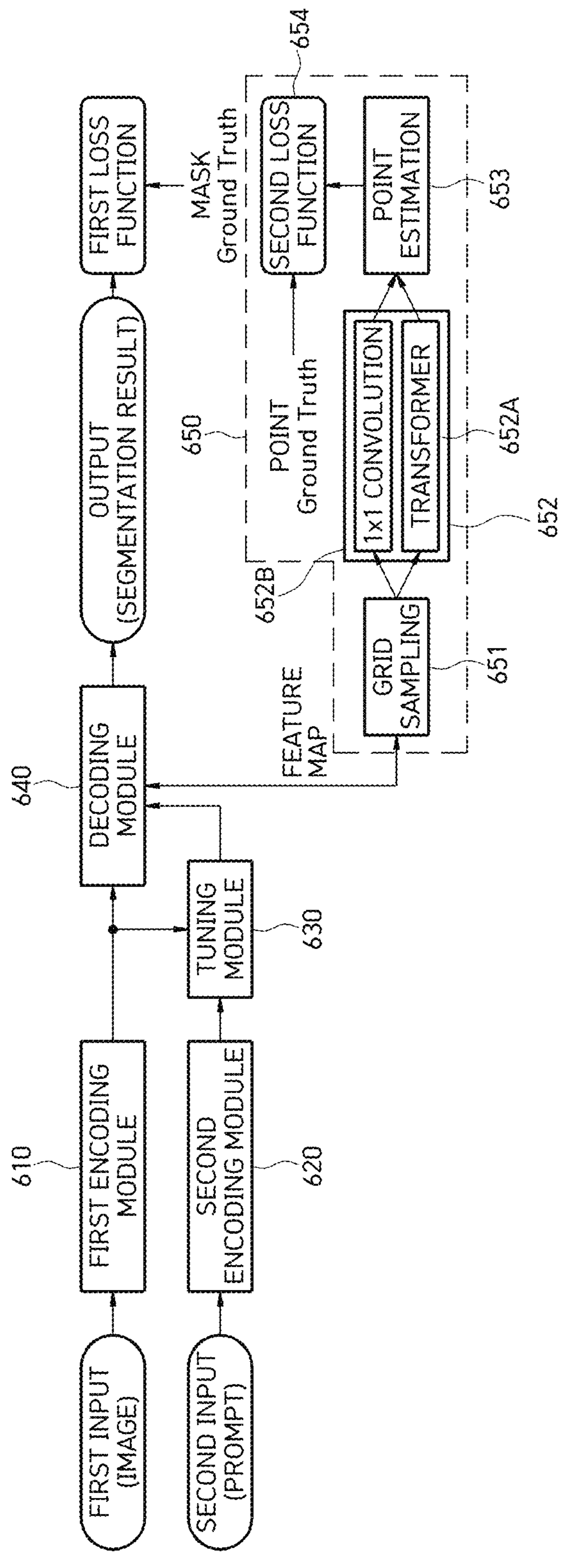
FIG. 9 is a conceptual diagram illustrating a learning process of a tuning module according to an embodiment.
Figure 10:
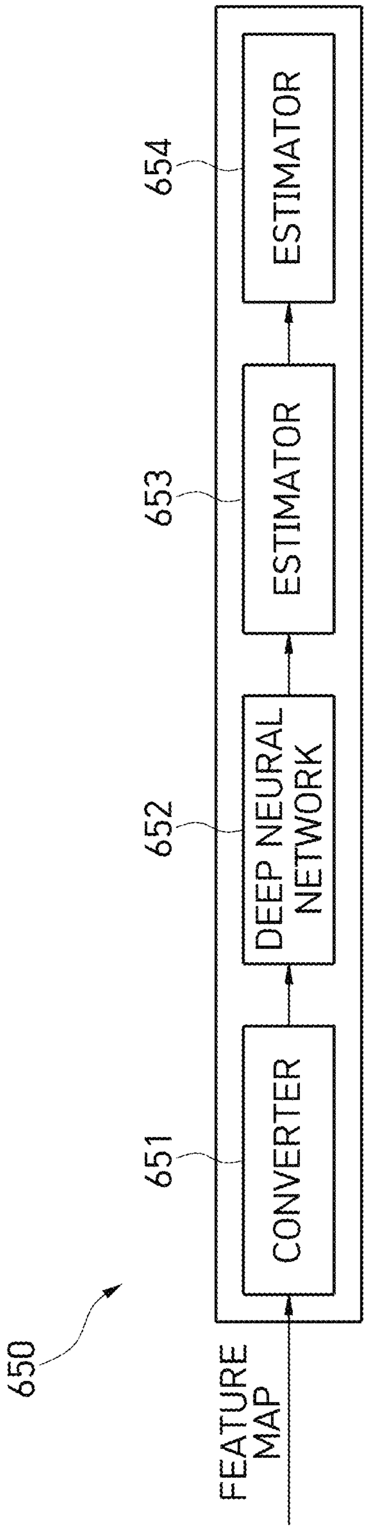
FIG. 10 is a block diagram illustrating a detailed configuration related to a learning process of a tuning module according to an embodiment.

FIG. 9 is a conceptual diagram illustrating a learning process of a tuning module according to an embodiment, and FIG. 10 is a conceptual diagram illustrating a detailed configuration related to a learning process of a tuning module according to an embodiment.

Referring to FIG. 9, the tuning module 630 according to an embodiment may collaborate with a reasoner 650 in the operation of learning to tune a prompt.

According to an embodiment, the reasoner 650 may obtain image feature information (a feature map) from the decoding module 640 and learn representative points of a segmentation mask based on the feature map.

Referring to FIG. 10, the reasoner 650 according to an embodiment may include a converter 651, a deep neural network 652, an estimator 653, and a calculator 654.

According to an embodiment, the converter 651 may scale-convert image feature information (hereinafter referred to as a "feature map") obtained from the decoding module 640 to correspond to the size of the input image. For example, when the input image has a size of 224×224, the feature map may have a size of 56×56, which is smaller than that of the input image. In this case, the converter 651 may scale-convert the feature map to match the size of the input image such that each feature of the feature map may have coordinate values mapped to each of the pixels of the input image (e.g., coordinates (10, 10) of a feature map are mapped to coordinates (30, 30) of the input image).

According to an embodiment, the deep neural network 652 may extract a plurality of features from the scale-converted feature map. For example, referring to FIG. 9, the deep neural network 652 may include a convolution operation unit 652A (e.g., a 1×1 convolution, or a channel-wise convolution) that extracts a first feature in units of image tokens from the scale-converted feature map and a transformer 652B that extracts a second feature by performing a self-attention operation on the scale-converted feature map.

According to an embodiment, the estimator 653 (e.g., a prediction layer) may obtain a plurality of features (the first and second features) and estimate a specified number of (e.g., 64) representative points (e.g. boundary points) for the segmentation mask based on the obtained plurality of features.

According to an embodiment, the calculator 654 may calculate an error (the distance) between the estimated representative points and a correct answer (e.g., a point ground truth shown in FIG. 9). The correct answer (a label) may be input by a user (e.g., a developer).

Afterwards, the reasoner 650 (e.g., the deep neural network 652 and the estimator 653), the first operator 631, the second operator 632, the feature concatenator 634, the multi-layer perceptron 633, and the summator 635 may be trained and configured to have parameters thereof adjusted to minimize the calculated error such that prompt feature information is tuned according to a specified purpose. For example, the reasoner 650 (e.g., the deep neural network 652 and the estimator 653), the first operator 631, the second operator 632, the feature concatenator 634, the multi-layer perceptron 633, and the summator 635 may be trained and configured such that the distance between a specified number of representative points estimated from the feature map and the correct answer is minimized. Additionally, the apparatus for image recognition 500 may use a segmentation mask generated by the decoding module 640 and a correct answer mask to calculate a focal loss, a dice loss, and an intersection over union (IoU) loss between the two masks. The apparatus for image recognition 500 may be trained and configured to minimize the calculated losses.

As described above, the apparatus for image recognition 500 according to an embodiment may resolve the limitations that it is difficult to reflect a user's specific intention with only a user's input (e.g., a point or box) in the conventional deep learning model. Specifically, the apparatus for image recognition 500 according to an embodiment may additionally learn a specific type of object dataset to be used for image segmentation, thereby adjusting the detailed functions (or granularity) of the general-purpose foundation model to suit a specific requirement of the user. Therefore, users may efficiently utilize large-scale foundation models while obtaining more accurate and detailed results.

Figure 11:
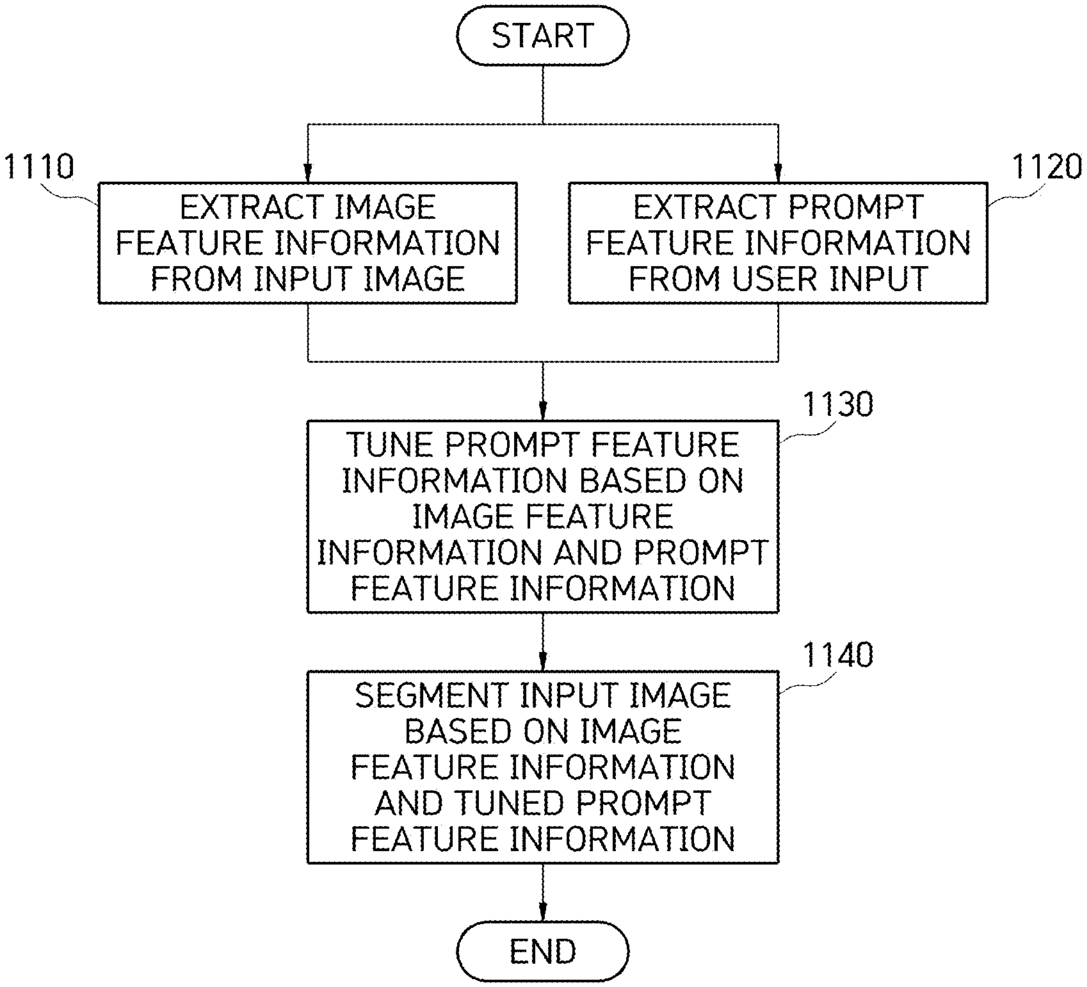
FIG. 11 is a flowchart showing a method of segmenting an image according to an embodiment.

FIG. 11 is a flowchart showing a image segmentation method according to an embodiment.

Referring to FIG. 11, in operation 1110, the apparatus for image recognition 500 may extract image feature information from an input image.

In operation 1120, the apparatus for image recognition 500 may encode a user input related to segmentation of the input image to extract prompt feature information.

In operation 1130, the apparatus for image recognition 500 may tune the extracted prompt feature information according to a specified purpose using the image feature information and the extracted prompt feature information. For example, the apparatus for image recognition 500 may apply a self-attention operation, a cross-attention operation, and a multi-layer perceptron on information related to at least one of the extracted prompt feature information and the image feature information to obtain a prompt change amount. The apparatus for image recognition 500 may generate the tuned prompt feature information based on the prompt change amount and the extracted prompt feature information.

In operation 1140, the apparatus for image recognition 500 may segment the input image based on the image feature information and the tuned prompt feature information to generate a segmentation mask. For example, the apparatus for image recognition 500 may mask a portion of the input image and output the masked input image.

Figure 12:
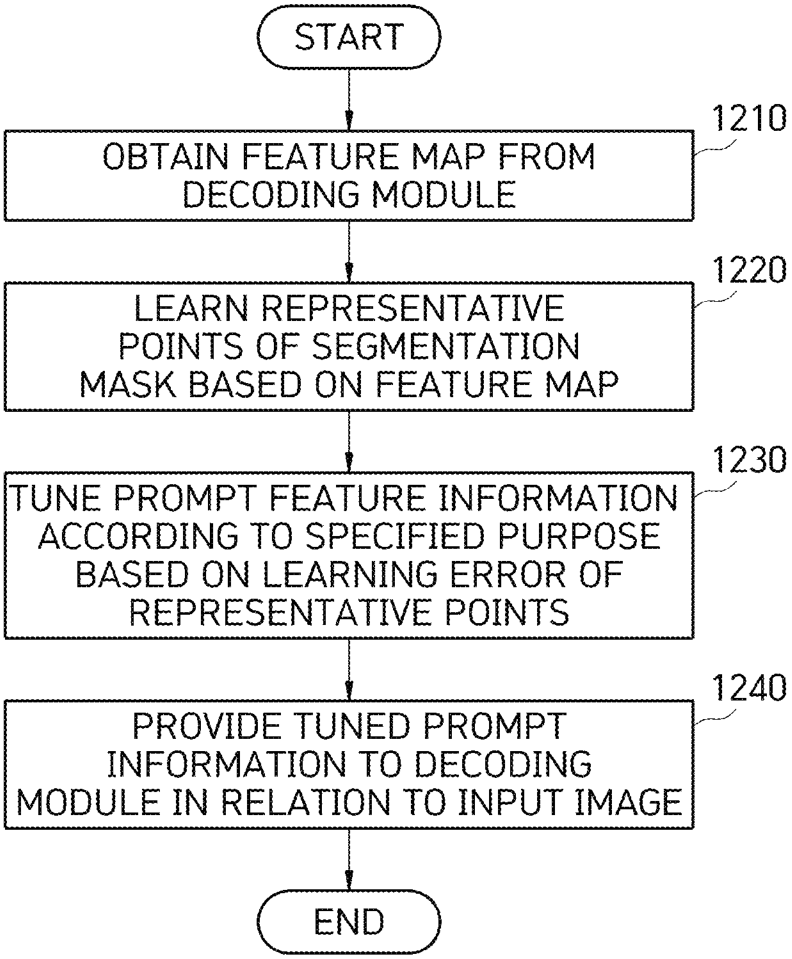
FIG. 12 is a flowchart showing a prompt tuning learning method according to an embodiment.

FIG. 12 is a flowchart showing a prompt tuning learning method according to an embodiment.

Referring to FIG. 12, in operation 1210, the tuning module 630 may obtain a feature map generated by the decoding module 640, which is configured to generate a segmentation mask corresponding to prompt feature information from an input image.

In operation 1220, the tuning module 630 may learn representative points of the segmentation mask according to a specified purpose based on the feature map in collaboration with the reasoner 650. For example, reasoner 650 may scale-convert the generated feature map to correspond to the input image and extract a plurality of features from the scale-converted feature map using a deep neural network. The reasoner 650 may estimate boundary points of the segmentation mask based on the plurality of features and learn the representative points such that an error between the estimated boundary points and a correct answer is minimized. The reasoner 650 may minimize the error by adjusting parameters of the deep neural network 652, which extracts a plurality of features, and the estimator 653, which estimates the boundary points based on the plurality of features, during the learning process. Additionally, the reasoner 650 may minimize the error by adjusting parameters of components (e.g., 631 to 635)—included in the tuning module 630—related to tuning of the extracted prompt feature information during the learning process.

In operation 1230, the tuning module 630 may tune the prompt feature information according to a specified purpose based on the learning error of the representative points. For example, the tuning module 630 may tune the extracted prompt feature information according to a specified purpose during the learning process and after the learning process.

In operation 1240, the tuning module 630 may provide the tuned prompt feature information as an input to the decoding module 640 in relation to the input image.

In the above-described embodiment, the tuning module 630 may be configured to tune on prompt feature information according to a specified purpose by repeating operations 1210 to 1240.

Figure 13:
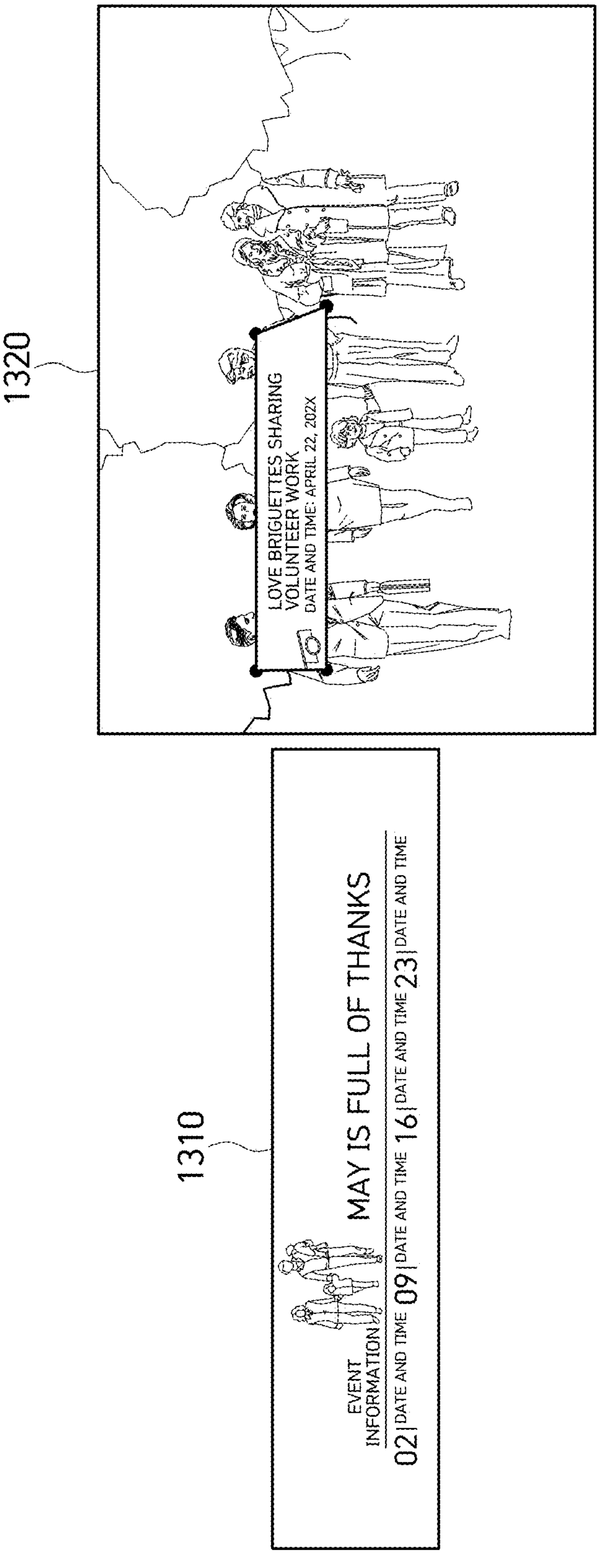
FIGS. 13 to 15 are examples of banner segmentation results by an apparatus for image recognition according to an embodiment.
Figure 14:
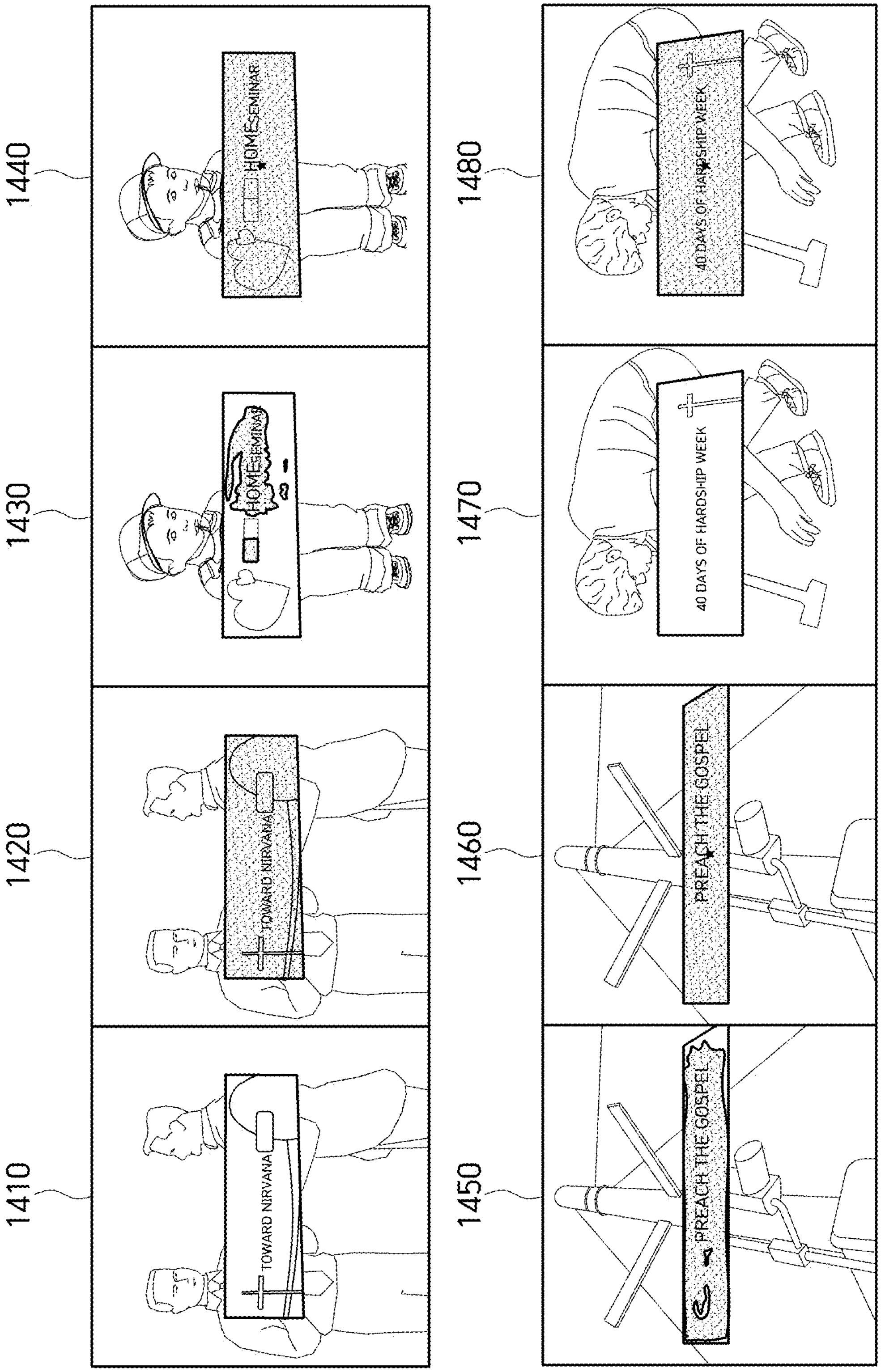
Figure 15:
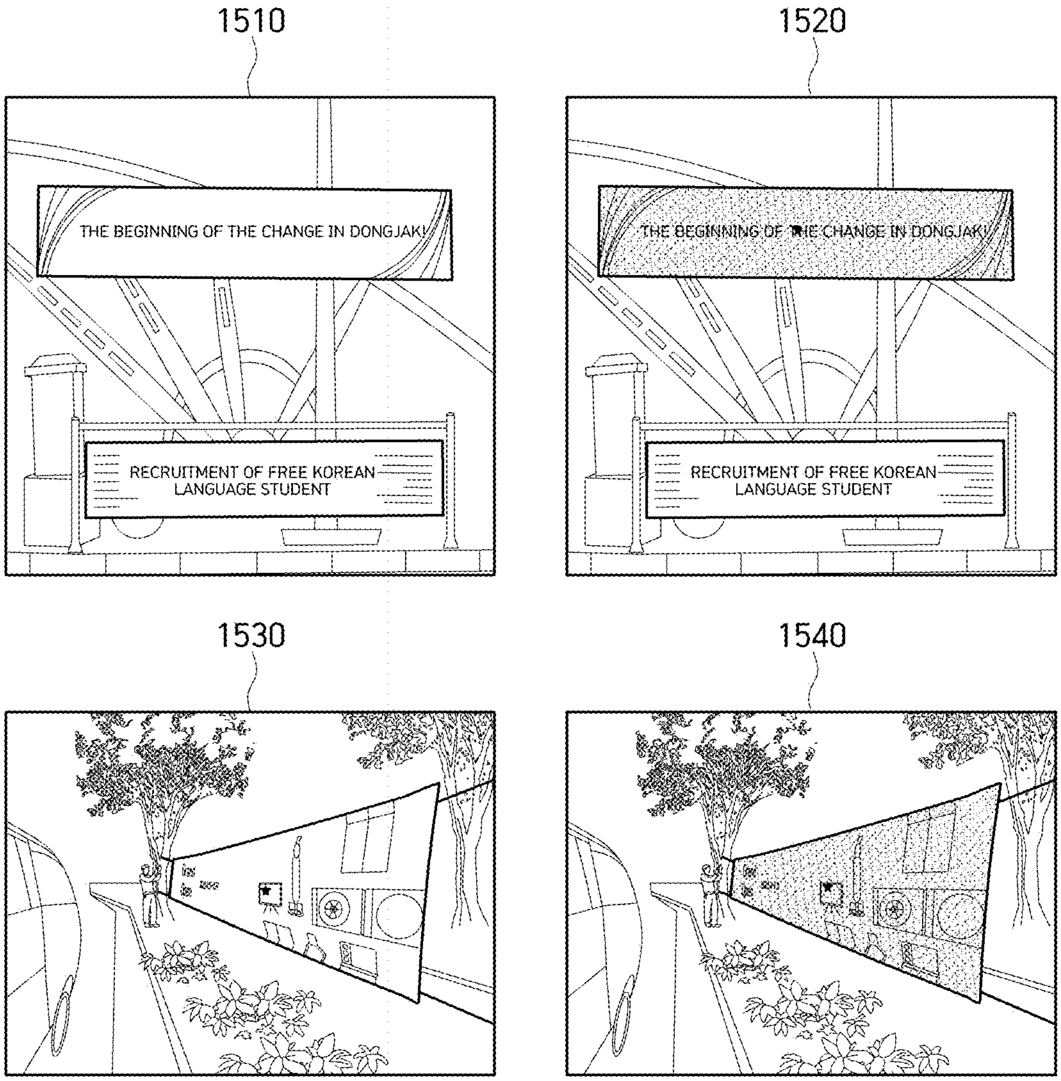

Hereinafter, with reference to FIGS. 13 to 15, the effect of prompt tuning according to an embodiment will be described based on an embodiment in which a banner area in an input image is segmented. FIGS. 13 to 15 show examples of banner segmentation results by an apparatus for image recognition according to an embodiment. In FIGS. 13 to 15, training data for segmenting position information of a banner in an input image may be 3,980 banner designs (e.g., 1310 in FIG. 13) collected through web crawling. The collected images were augmented by being synthesized with random background images to increase the diversity of the training data, and performed geometric transformation to reflect the camera distortion effect in the images (preprocessing). Among the data preprocessed as described above (e.g., 1320 in FIG. 13), 3,000 images were used as training data and the remaining 980 images were used as verification data.

<Learning Operation>

In a learning process, the apparatus for image recognition 500 was trained to mask and output a banner area based on synthesized data.

Referring to FIG. 13, using synthesized data (e.g., 1320 in FIG. 13), the apparatus for image recognition 500 is trained to generate an image that masks a banner area in the input image (e.g., 1320 in FIG. 13). For example, during the learning process, only the parameters of the tuning module 630 are updated, and the remaining parts of the apparatus for image recognition 500 may maintain the parameters of the existing model (e.g., the SAM). Through the above-described learning, the apparatus for image recognition 500 may tune prompt feature information such that the variation in the segmentation result due to small changes in prompt feature information according to a user input is minimized, and a user's intention (in the case of a banner image, given the point at the center of the banner, a correct answer is that the entire area is intended to be visible) is accurately reflected. Accordingly, a desired segmentation result may be obtained even without an elaborate prompt input.

<Inference Operation>

The apparatus for image recognition 500 may perform segmentation on an input image using an approach that is the same as or similar to that of an existing model. For example, when at least one coordinates (e.g. central coordinates) of a banner are input as a user input, the apparatus for image recognition 500 may output an image segmentation result masked an object including the input coordinates.

With regard to the segmentation results for the synthesized image, as shown in FIG. 14, the existing model provided result images 1410, 1430, 1450, and 1470 that mask only a partial area inside the banner in the input image. On the other hand, the apparatus for image recognition 500 according to an embodiment provided results 1420, 1440, 1460, and 1480 that successfully mask the entire area of the banner in the input image.

Even in the segmentation results for capturing images in a real environment, the segmentation performance of the apparatus for image recognition 500 according to an embodiment was excellent. Referring to FIG. 15, the existing model had only a portion of the banner area masked in the input images, as shown in the results 1510 and 1530, but the apparatus for image recognition 500 according to an embodiment provided results 1520 and 1540 that mask the entire banner area.

In order to evaluate the accuracy of segmenting areas from 980 verification dataset images described above, the performance of the apparatus for image recognition 500 according to an embodiment was measured based on a mask intersection over union (IoU). As shown in Table 1 below, the performance improvement of the apparatus for image recognition 500 according to an embodiment was very significant.

TABLE 1

| Division | Performance (mask IoU) |
|---|---|
| Existing model | 0.301652 |
| Model of one embodiment | 0.974402 |

Figure 16:
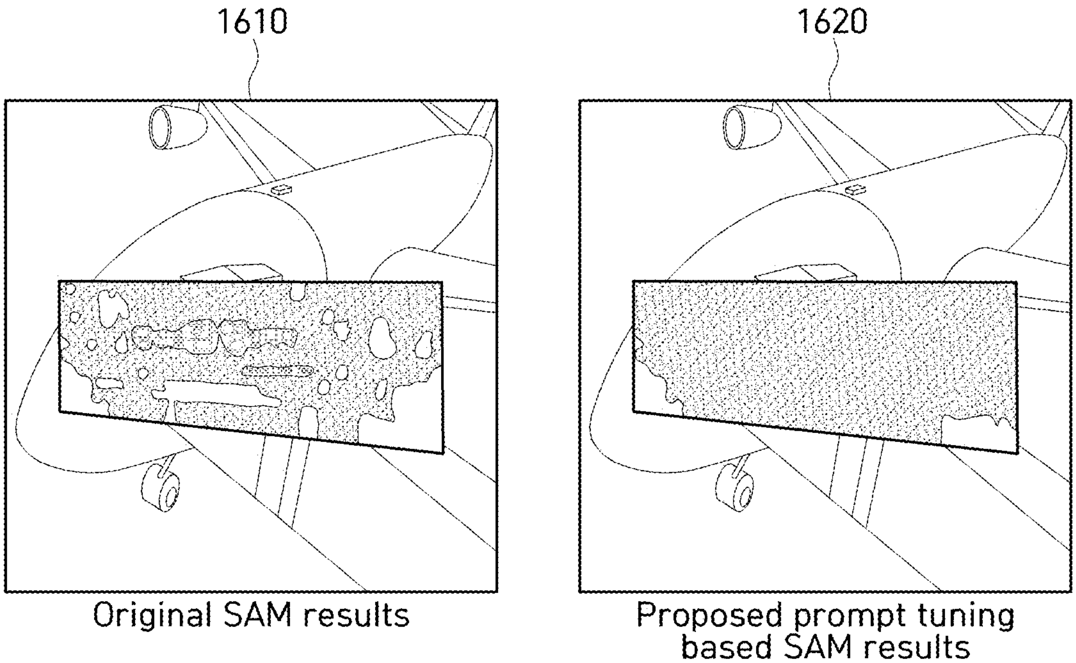
FIG. 16 is an example comparing masking area detection results according to point positions of a user input.

FIG. 16 is an example comparing masking area detection results according to point positions of a user input. The existing model had a limitation in that masking performance greatly varied depending on the position of the prompt point. Also, the existing model sometimes failed to perform area detection when a prompt was given in a text area inside a banner.

On the other hand, the apparatus for image recognition 500 according to an embodiment may accurately detect the banner area even when the point position of a user input within the banner is changed.

Referring to FIG. 16, the existing model may not detect an area including text in the banner area as a banner (see the central part in a patterned area in a result 1610). However, the apparatus for image recognition 500 according to an embodiment may accurately detect most of the area of the banner (see a patterned area in a result 1620) except for some edges of the banner.

Figure 17:
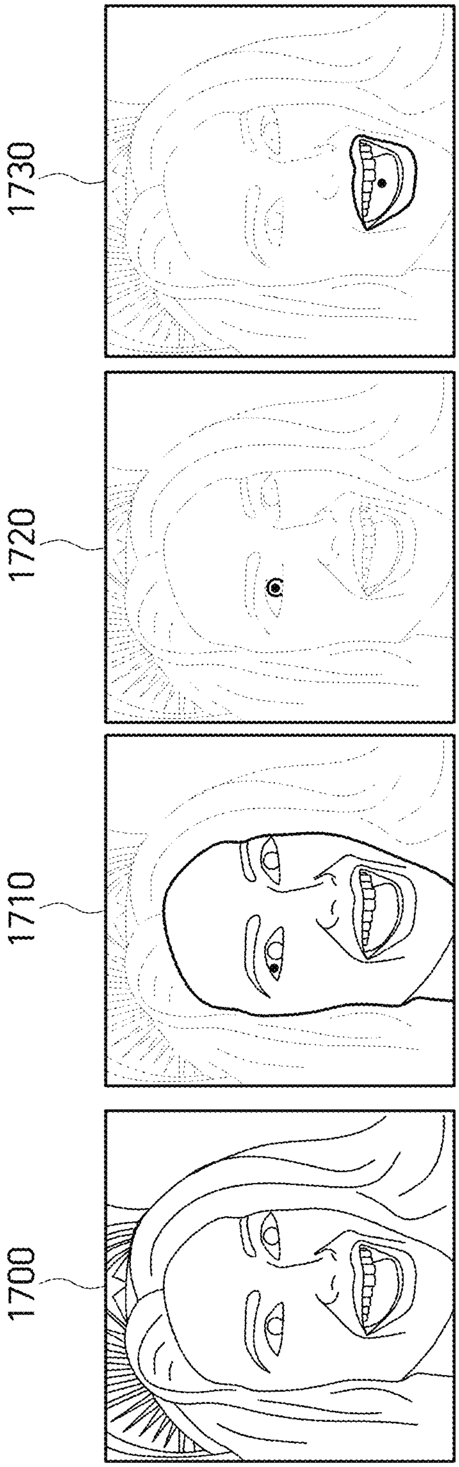
FIGS. 17 and 18 are examples comparing a face image segmentation result according to an existing model with a face image segmentation result according to an embodiment.
Figure 18:
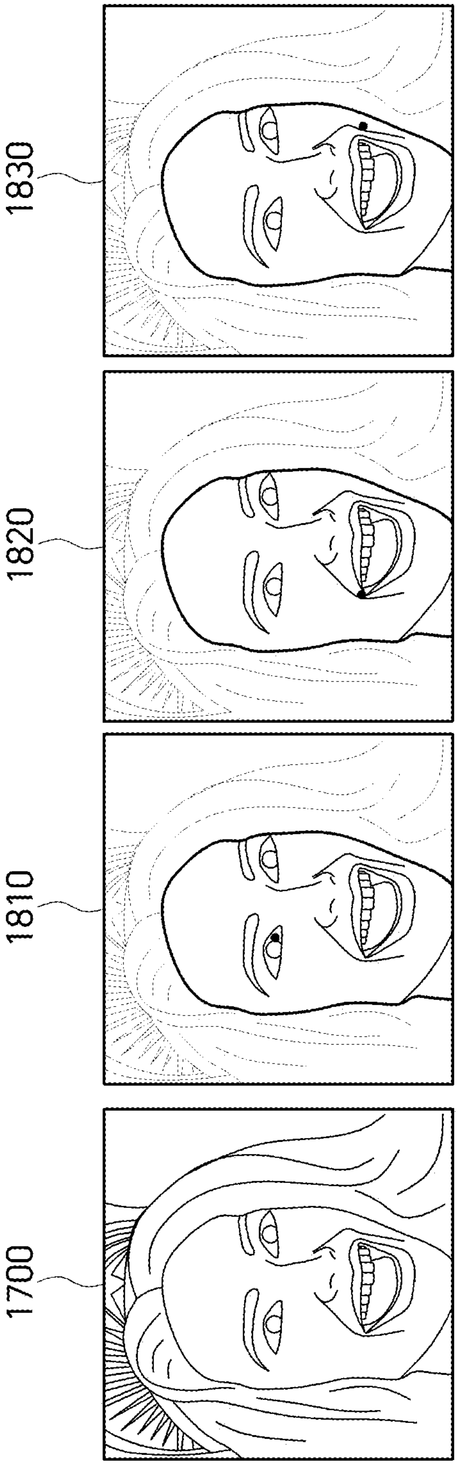

FIGS. 17 and 18 are examples comparing a face image segmentation result according to an existing model with a face image segmentation result according to an embodiment.

In the existing model, it is difficult to accurately recognize a user input (refer to 'black point' of FIG. 17) for segmenting a facial part excluding hair with respect to an input face image 1700. Referring to FIG. 17, the existing model may provide a result 1710 that accurately segments the face area, or may provide ambiguous results 1720 and 1730 which segment only apart, such as "eyes," "mouth," and "teeth." depending on the input position. In FIG. 17, the result 1720 is an example in which the pupil part is segmented according to a user selecting (or inputting) the pupil portion. And the result 1730 is an example in which the mouth part is segmented according to a user selecting the mouth portion.

On the other hand, referring to FIG. 18, the apparatus for image recognition 500 according to an embodiment may provide results 1810, 1820, and 1830 that accurately segment the face area according to the user's intention regardless of the selected position in the face area.

Figure 19:
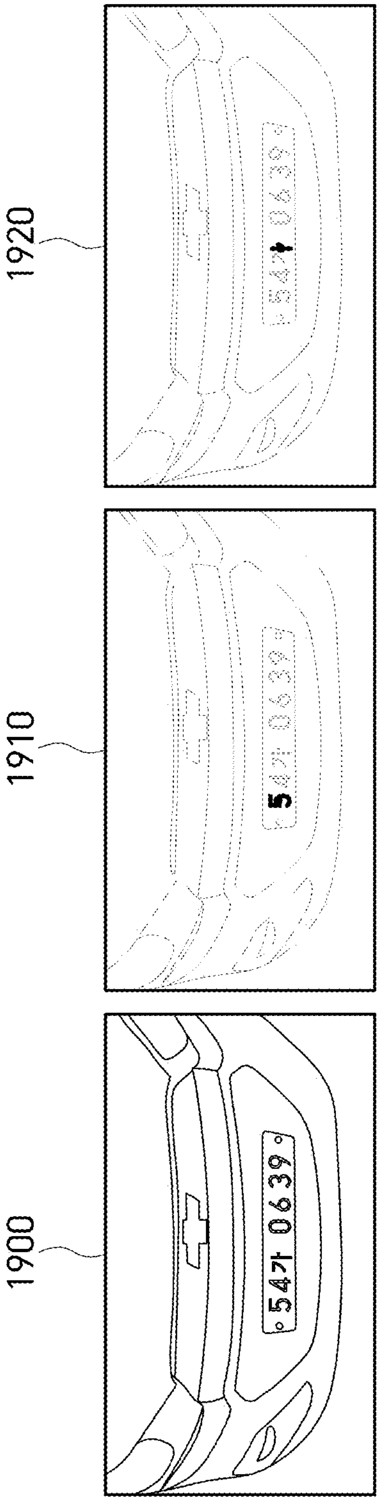
FIGS. 19 and 20 are examples comparing a vehicle license plate segmentation result according to an existing model with a vehicle license plate segmentation result according to an embodiment.
Figure 20:
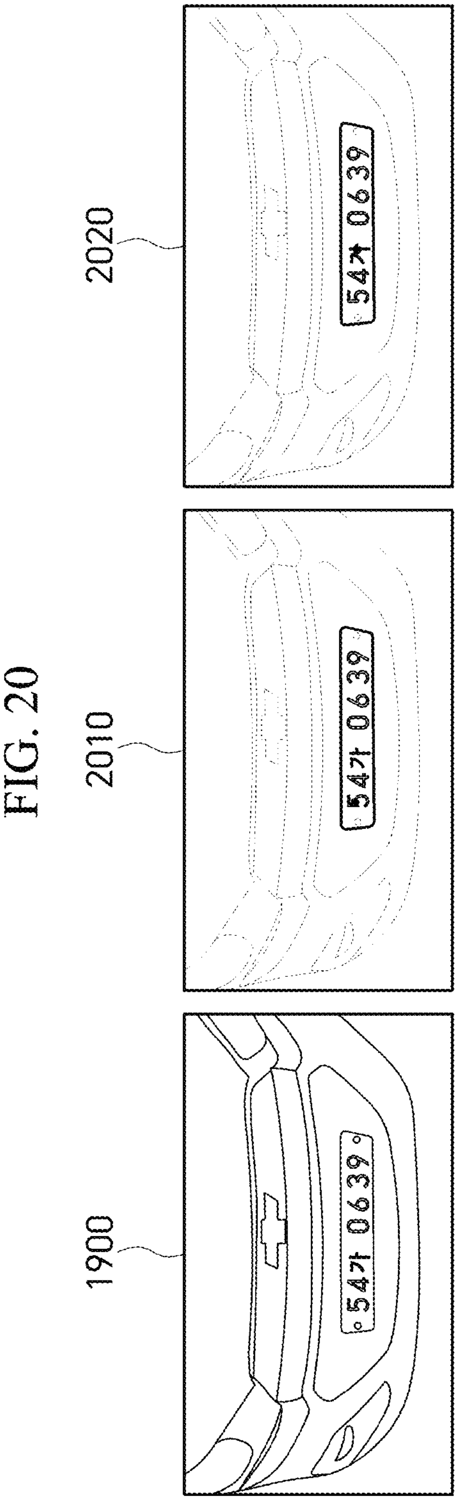

FIGS. 19 and 20 are examples comparing a vehicle license plate segmentation result according to an existing model with a vehicle license plate segmentation result according to an embodiment.

Referring to FIG. 19 that shows input/output images of the existing model, the existing model failed to properly identify a user's intention, and only segmented a portion of letters or only a letter area written on a license plate in an input vehicle front image 1900 as shown in results 1910 and 1920.

On the other hand, referring to FIG. 20 that shows input and output images of the apparatus for image recognition 500, the proposed image processing technique may accurately reflect a user's intention. Specifically, the apparatus for image recognition 500 may provide a result that accurately segments the entire license plate area regardless of the position of a selected point inside the license plate in the input vehicle front image 1900.

As in the above-described embodiment, it can be seen that the apparatus for image recognition 500 according to an embodiment provides segmentation results that are robust to the position of a user input even when segmenting various domain images, such as a banner area, a face area, and a vehicle license plate area.

The various embodiments of the disclosure and terminology used herein are not intended to limit the technical features of the disclosure to the specific embodiments, but rather should be understood to cover all modifications, equivalents, and alternatives falling within the spirit and scope of the invention. In the description of the drawings, like numbers refer to like elements throughout the description of the drawings. The singular forms preceded by "a," "an," and "the" corresponding to an item are intended to include the plural forms as well unless the context clearly indicates otherwise. In the disclosure, a phrase such as "A or B," "at least one of A and B," "at least one of A or B," "A, B or C," "at least one of A, B and C," and "at least one of A, B, or C" may include any one of the items listed together in the corresponding phrase, or any possible combination thereof. Terms such as "first," "second," etc. are used to distinguish one element from another and do not modify the elements in other aspects (e.g., importance or sequence). When one (e.g., a first) element is referred to as being "coupled" or "connected" to another (e.g., a second) element with or without the term "functionally" or "communicatively," it means that the one element is connected to the other element directly (e.g., by wire), wirelessly, or via a third element.

As used herein, the term "module" may include units implemented in hardware, software, or firmware, and may be interchangeably used with terms such as "logic," "logic block," "component," or "circuit." The module may be an integrally configured component or a minimum unit or part of the integrally configured component that performs one or more functions. For example, according to one embodiment, the module may be implemented in the form of an application-specific integrated circuit (ASIC).

The various embodiments of the present disclosure may be realized by software (e.g., a program) including one or more instructions stored in a storage medium (e.g., the memory 530, such as an internal memory or external memory) that can be read by a machine (e.g., the apparatus for image recognition 500). For example, a processor (e.g., the processor 510) of the machine (e.g., the apparatus for image recognition) may invoke and execute at least one instruction among the stored one or more instructions from the storage medium. Accordingly, the machine operates to perform at least one function in accordance with the invoked at least one command. The one or more instructions may include codes generated by a compiler or codes executable by an interpreter. The machine-readable storage medium may be provided in the form of a non-transitory storage medium. Here, when a storage medium is referred to as "non-transitory," it can be understood that the storage medium is tangible and does not include a signal (for example, electromagnetic waves), but rather that data is semi-permanently or temporarily stored in the storage medium.

According to one embodiment, the methods according to the various embodiments disclosed herein may be provided in a computer program product. The computer program product may be traded between a seller and a buyer as a product. The computer program product may be distributed in the form of a machine-readable storage medium (e.g., a compact disc read only memory (CD-ROM)), or may be distributed directly between two user devices (e.g., smartphones) through an application store (e.g., Play Store™), or online (e.g., downloaded or uploaded). In the case of online distribution, at least a portion of the computer program product may be stored at least semi-permanently or may be temporarily generated in a machine-readable storage medium, such as a memory of a server of a manufacturer, a server of an application store, or a relay server.

Components according to various embodiments of the disclosure 0 may be implemented in the form of software or hardware, such as a digital signal processor (DSP), a field programmable gate array (FPGA) or an application specific integrated circuit (ASIC), and may perform predetermined functions. The "elements" are not limited to meaning software or hardware. Each of the elements may be configured to be stored in a storage medium capable of being addressed and configured to execute one or more processors. For example, the elements may include elements such as software elements, object-oriented software elements, class elements, and task elements, processes, functions, attributes, procedures, subroutines, segments of a program code, drivers, firmware, microcode, circuits, data, databases, data structures, tables, arrays, and variables.

According to the various embodiments, each of the above-described elements (e.g., a module or a program) may include a singular entity or a plurality of entities. According to various embodiments, one or more of the above-described elements or operations may be omitted, or one or more other elements or operations may be added. Alternatively, or additionally, a plurality of elements (e.g., modules or programs) may be integrated into one element. In this case, the integrated element may perform one or more functions of each of the plurality of elements in a manner the same as or similar to that performed by the corresponding element of the plurality of components before the integration. According to various embodiments, operations performed by a module, program, or other elements may be executed sequentially, in parallel, repeatedly, or heuristically, or one or more of the operations may be executed in a different order, or omitted, or one or more other operations may be added.

As is apparent from the above, according to various embodiments of the disclosure, a part of an input image can be segmented or masked according to a prompt input intended by a user. In addition, various effects that can be directly or indirectly identified through this document can be provided.

What is claimed is:

1. An apparatus for image recognition, comprising:
- at least one processor;
- a memory having instructions stored thereon, which, when executed by the at least one processor, cause the at least one processor to implement:
- a first encoding module configured to extract image feature information from an input image;
- a second encoding module configured to encode a user input related to segmentation of the input image to extract prompt feature information;
- a tuning module configured to tune the extracted prompt feature information according to a specified purpose using the image feature information and the extracted prompt feature information; and
- a decoding module configured to generate a segmentation mask based on the image feature information and the tuned prompt feature information,
- wherein the tuning module is configured to:
- apply a self-attention operation, a cross-attention operation, and a multi-layer perceptron to at least one of the extracted prompt feature information and the image feature information to obtain a prompt change amount; and
- generate the tuned prompt feature information based on the prompt change amount and the extracted prompt feature information.

2. The apparatus of claim 1, wherein the tuning module includes:
- a first operator configured to perform the self-attention operation on the extracted prompt feature information;
- a second operator configured to perform the cross-attention operation on an output of the first operator and the image feature information; and
- a multi-layer perceptron configured to extract the prompt change amount based on an output of the second operator.

3. The apparatus of claim 2, wherein the second operator obtains the result of the first operator as a query, obtains a key and a value from the image feature information, and performs the cross-attention operation.

4. The apparatus of claim 2, wherein the second operator includes a plurality of sub-operation units configured to respectively perform cross-attention operations each using different parameters, and
- the tuning module further includes a feature concatenation unit which combines outputs of the plurality of sub-operation units.

5. The apparatus of claim 1, wherein the tuning module generates the tuned prompt feature information by weighted sum of the prompt change amount and the extracted prompt feature information.

6. The apparatus of claim 1, wherein the at least one processor further implements a reasoner configured to learn representative points of the segmentation mask based on the image feature information,
- wherein the tuning module learns to tune the extracted prompt feature information according to the specified purpose based on an error of the reasoner.

7. An apparatus for image recognition, comprising:
- at least one processor;
- a memory having instructions stored thereon, which, when executed by the at least one processor, cause the at least one processor to implement:
- a first encoding module configured to extract image feature information from an input image;
- a second encoding module configured to encode a user input related to segmentation of the input image to extract prompt feature information;
- a tuning module configured to tune the extracted prompt feature information according to a specified purpose using the image feature information and the extracted prompt feature information;
- a decoding module configured to generate a segmentation mask based on the image feature information and the tuned prompt feature information; and
- a reasoner configured to learn representative points of the segmentation mask based on the image feature information,
- wherein the tuning module learns to tune the extracted prompt feature information according to the specified purpose based on an error of the reasoner,
- wherein the reasoner includes:
- a converter configured to scale-convert the image feature information to correspond to the input image;
- a deep neural network configured to extract a plurality of features from the scale-converted image feature information;
- an estimator configured to estimate boundary points of the segmentation mask as the representative points based on the plurality of features; and
- a calculator configured to calculate an error between the estimated boundary points and a correct answer.

8. The apparatus of claim 7, wherein the plurality of features include a first feature and a second feature, and
- the deep neural network includes:
- a convolution operation unit configured to extract the first feature in units of image tokens from the scale-converted image feature information; and
- a transformer configured to perform a self-attention operation on the scale-converted image feature information to extract the second feature.

9. A prompt tuning method related to image segmentation, the method comprising:
- obtaining, from an input image, a feature map which is generated by a decoding module, wherein the decoding module is configured to generate a segmentation mask corresponding to input prompt feature information;
- learning representative points of the segmentation mask according to a specified purpose based on the feature map;

tuning the prompt feature information according to a specified purpose based on a learning error of the representative points; and providing the tuned prompt feature information as an input to the decoding module in relation to the input image, wherein the learning of the representative points includes:

scale-converting the generated feature map to correspond to the input image;

extracting a plurality of features from the scale-converted feature map using a deep neural network;

estimating boundary points of the segmentation mask based on the plurality of features; and minimizing an error between the estimated boundary points and a correct answer.

10. The method of claim 9, wherein the plurality of features include a first feature and a second feature, and the extracting of the plurality of features includes:

extracting the first feature in units of image tokens from the scale-converted feature map through a convolution operation; and performing a self-attention operation on the scale-converted feature map, using a transformer to extract the second feature.

11. The method of claim 9, wherein the minimizing of the error includes adjusting first parameters used in the extracting of the plurality of features and the estimating of the boundary points.

12. The method of claim 11, wherein the minimizing of the error includes:

adjusting second parameters used in the tuning; and repeating operations including obtaining a plurality of features from another feature map generated from the input image by the decoding module after the adjusting of the second parameters, estimating the boundary points, and calculating the error to minimize the error.

13. The method of claim 9, wherein the input prompt feature information is generated by encoding at least one type of user input among a point, a bounding box, a mask, and user speech.

14. An image segmentation method comprising:

extracting image feature information from an input image;

encoding a user input related to segmentation of the input image to extract prompt feature information;

tuning the extracted prompt feature information according to a specified purpose using the image feature information and the extracted prompt feature information; and generating a segmentation mask based on the image feature information and the tuned prompt feature information, wherein the tuning includes:

applying a self-attention operation, a cross-attention operation, and a multi-layer perceptron to at least one of the extracted prompt feature information and the image feature information and obtaining a prompt change amount; and generating the tuned prompt feature information based on the prompt change amount and the extracted prompt feature information.

15. The method of claim 14, wherein the obtaining of the prompt change amount includes:

obtaining a result of the self-attention operation as a query;

obtaining a key and a value from the image feature information; and performing the cross-attention operation on the query, the key, and the value.

16. The method of claim 14, further comprising learning representative points of the segmentation mask based on a feature map generated in the generating of the segmentation mask, wherein the learning of the representative points includes learning to tune the extracted prompt feature information according to the specified purpose to minimize an inference error of the representative points.

17. The method of claim 16, wherein the learning of the representative points includes:

scale-converting the generated feature map to correspond to the input image;

extracting a plurality of features from the scale-converted feature map through a deep neural network;

estimating boundary points of the segmentation mask based on the plurality of features; and calculating an error between the estimated boundary points and a correct answer.

* * * * *